United States Patent
Young et al.

(10) Patent No.: US 9,846,624 B2
(45) Date of Patent: Dec. 19, 2017

(54) FAST SINGLE-MASTER FAILOVER

(71) Applicant: Microsoft Technology Licensing, LLC, Redmond, WA (US)

(72) Inventors: Douglas A. Young, Mountain View, CA (US); Ang Xu, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 87 days.

(21) Appl. No.: 14/497,917

(22) Filed: Sep. 26, 2014

(65) Prior Publication Data
US 2016/0092324 A1 Mar. 31, 2016

(51) Int. Cl.
*G06F 11/00* (2006.01)
*G06F 11/20* (2006.01)

(52) U.S. Cl.
CPC ...... *G06F 11/2033* (2013.01); *G06F 11/2028* (2013.01); *G06F 11/2038* (2013.01); *G06F 11/2048* (2013.01)

(58) Field of Classification Search
USPC ........................................................ 714/6.21
See application file for complete search history.

(56) References Cited

U.S. PATENT DOCUMENTS

| | | | | |
|---|---|---|---|---|
| 7,120,690 B1 * | 10/2006 | Krishnan | .......... | G06F 17/30575 707/999.2 |
| 2005/0198552 A1 * | 9/2005 | Baba | .................. | G06F 11/2023 714/6.3 |
| 2006/0190766 A1 * | 8/2006 | Adler | .................. | G06F 11/2025 714/13 |
| 2010/0042715 A1 * | 2/2010 | Tham | .................. | G06F 11/2025 709/224 |
| 2010/0257399 A1 * | 10/2010 | Brown | ................ | H04L 67/1095 714/4.1 |

(Continued)

OTHER PUBLICATIONS

Oracle Help Center, "Fusion Middleware Administrator's Guide for Oracle Access", http://docs.oracle.com/cd/E40329_01/admin.1112/e27239/mdc.htm#AIAAG88836, last viewed on May 21, 2015, 38 pages.

(Continued)

*Primary Examiner* — Sarai Butler
(74) *Attorney, Agent, or Firm* — Hickman Palermo Becker Bignham LLP; Daniel D. Ledesma

(57) ABSTRACT

Techniques for switching mastership from one service in a first data center to a second (redundant) service in a second data center are provided. A service coordinator in the first data center is notified about the master switch. The service coordinator notifies each instance of the first service that the first service is not a master. Each instance responds with an acknowledgement. After it is confirmed that all instances of the first service have responded with an acknowledgement, a client coordinator in the first and/or second data center is updated to indicate that the second service is the master so that clients may send requests to the second service. Also, a service coordinator in the second data center is notified that the second service is the master. The service coordinator notifies each instance of the second service that the second service is the master. Each instance responds with an acknowledgement.

33 Claims, 5 Drawing Sheets

(56) References Cited

U.S. PATENT DOCUMENTS

2012/0215779 A1* 8/2012 Lipstone .......... G06F 17/30035
707/737

OTHER PUBLICATIONS

Kraska et al., "MDCC: Multi-Data Center Consistency" Eurosys'13 Apr. 15-17, 2013, Prague, Czech Republic, AMC, 14 pages.
Barrett, Ryan "How Google Serves Data From Multiple Datacenters", http://highscalability.com/blog/2009/8/24/how-google-serves-data-from-multiple-datacenters.html, dated Aug. 24, 2009, 16 pages.

* cited by examiner

FAST SINGLE-MASTER FAILOVER

FIELD OF THE DISCLOSURE

The present disclosures generally relates to managing multiple services in multiple data centers and, more specifically, to handling failover scenarios for single-master services.

BACKGROUND

A data center is a facility used to house computer systems and associated components, such as telecommunications and storage systems. A data center generally includes redundant or backup power supplies, redundant data communications connections, environmental controls (e.g., air conditioning, fire suppression), and various security devices. A data center is typically used to support one or more web sites that experience a significant amount of web traffic so that end-user requests may be serviced in a relatively short amount of time.

A data center may host multiple services, some of which are available to clients outside the data center and others of which are available to "clients" within the data center. If multiple data centers are used, then some services provided by one data center may be replicated in other data centers. However, some services may need to run (or be active) in only a single data center, primarily because such services need to write to a single database. For example, a service that handles credit card transactions writes to a database in one data center. The written data is eventually replicated to other data centers. If there were duplicate services in multiple data centers, then the duplicate services could be out of sync. To prevent issues (such as double charging or a service not being able to find a payment in the current data center), all requests for certain services are sent to a "single-master service." A single-master service is a service that is active in only one data center at a time.

All clients of the service should know where the single-master service is located, regardless if the client is in the same data center as the single-master service or in another data center that does not host the single-master service.

For reliability, a copy of a single-master service is hosted in one or more other data centers. Such a copy is referred to a "slave service" and the one or more instances of the slave service are referred to as "slave instances." The slave service and the slave instances are considered dormant or inactive until they are triggered to be active. Thus, if a slave instance receives a client request (e.g., from a client in the same or different data center as the slave instance), then the slave instance is configured to not process the client request and may return an error or decline message.

However, switching mastership of a single-master service (so that the master service becomes the new slave service and the old slave service becomes the new master service) may require a significant amount of time and may have a considerable effect on available of data (e.g., a web site) provided by the data centers. In one approach, switching mastership is a manual process that involves changing configurations that are to be read by all clients of the single-master service, changing server side configurations, running commands to notify all clients of the change, and restarting both the current master service and the current slave service. For example, each service may read a configuration file at start up that indicates whether the service is a single-master service and with which databases the service can communicate. Any changes to the status of master require one or more services to be shut down, one or more configuration files to be modified, and the one or more services to be restarted. Such a process might take a significant amount of time, especially if multiple services are involved (e.g., one hour). Thus, if a single-master service is a payment service, then payments could not be received during that entire time. Additionally, when one or more single-master services are offline, other services, in all data centers, are also impacted, leading to a degraded user experience at best, and inability to serve users at all in the worst case.

Another example of a single-master service is a sticky-routing service that ensures that each user/member of a web site is directed to the same data center regardless of which device the user/member uses to access the web site. If the sticky-routing service goes down for even a few minutes, then data integrity issues might arise in addition to problems with user registration and log in.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for switching single-master services in a multi-data center environment. A single-master service is a service that is hosted by multiple data centers but is active in only one of the data centers while being inactive in the other data center(s). Instead of performing all the steps required to shut down and start up instances of a service when switching mastership of the service from one data center to another data center, a service coordinator in the data center of the current master is notified that the current master is no longer the master. In response, the service coordinator notifies each instance of the current master about the change. Each instance of the now old master eventually responds with an acknowledgement that the now old master is no longer the master.

In one technique, the new master is not notified that it is a new master until all instances of the old master respond with the acknowledgement. In this way, an instance of the old master will not consider that the old master is the current master at the same time that an instance of the new master considers the new master as the current master. In other words, it is guaranteed that both an instance of the old master (in one data center) and an instance of the new master (in another data center) will not act as the current master.

System Overview

Figure 1:
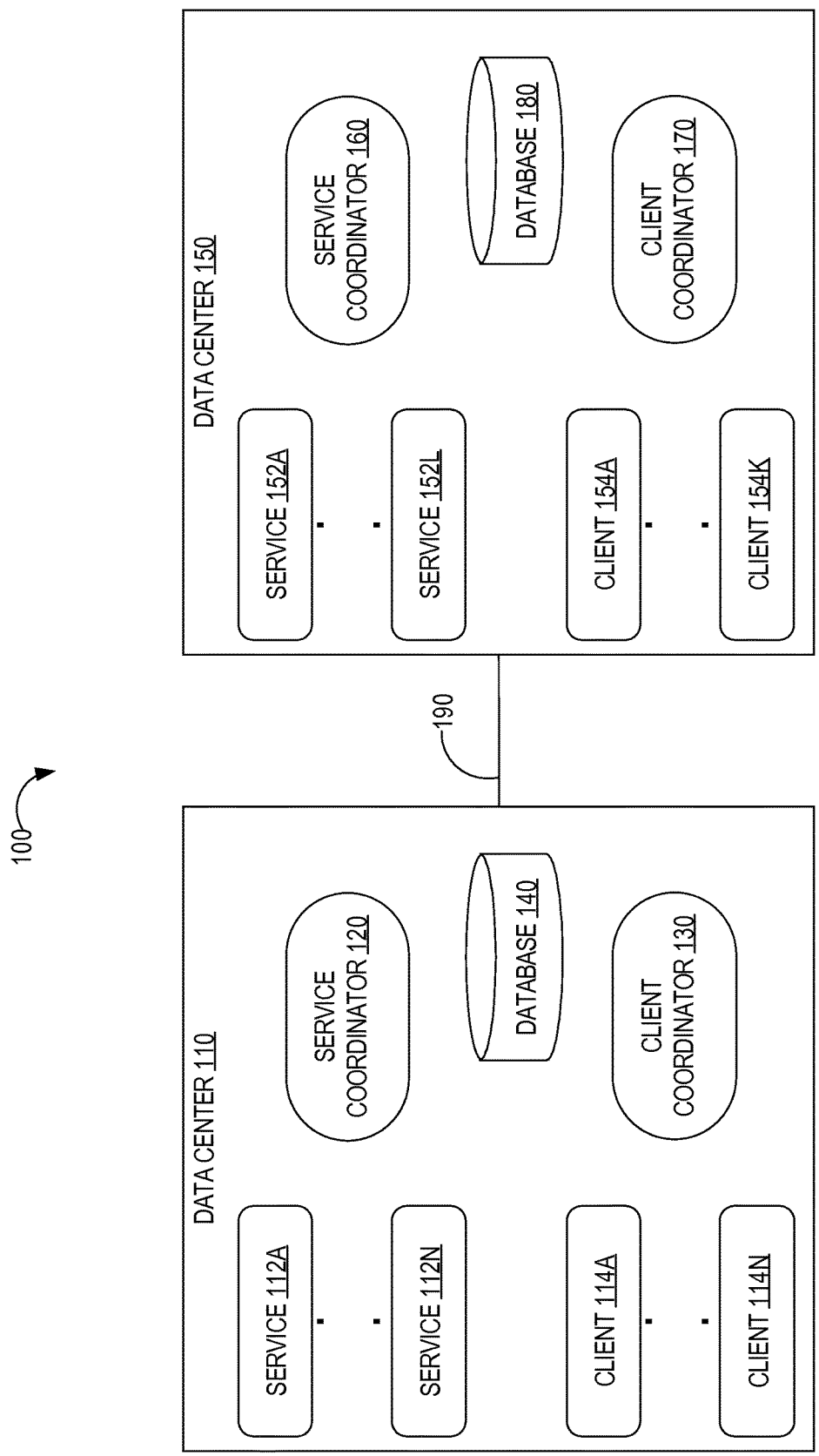
FIG. 1 is a block diagram that depicts an example system that includes two data centers, in an embodiment.

FIG. 1 is a block diagram that depicts an example system 100 that includes two data centers: data center 110 and data center 150, in an embodiment. Although FIG. 1 depicts only two data centers, system 100 may include more than two data centers.

Data center 110 includes services 112A-112N, clients 114A-114N, a service coordinator 120, a client coordinator 130, and a database 140.

Similarly, data center 150 includes services 152A-152L, clients 154A-154K, a service coordinator 160, a client coordinator 170, and a database 180.

Each of services 112A-112N and 152-152M provides a service to one or more of clients 114A-114N and clients 154A-154K. For example, client 114A may request data from service 112B (which is hosted in the same data center as client 114A) and/or from service 152C (which is hosted in data center 150). Examples services include a payment service, a user profile service, a mail service, and a sticky-node service that ensures that all end-user requests from the same end-user are all handled by the same data center regardless of which device the end-user is using.

A service (such as service 112A) may be hosted by single computing device (or node) or may be distributed among multiple nodes in a cluster. In this way, if one node goes down or otherwise fails, then one or more other nodes in the cluster may provide the service. Each node hosts one or more instances of the service. Thus, a single service may be provided by multiple instances of the service. Additionally, a single node may host instances of different services. For example, a single node in data center 110 may host an instance of service 112A, an instance of service 112B, etc.

Each of databases 140 and 180 includes one or more persistent storage devices. Although only a single database is depicted in each data center, each data center may include multiple databases for persistently storing data that is requested by end-users of system 100.

System 100 also includes a network link 190 that allows elements in data center 110 to communicate with elements in data center 150. For example, client 114A determines (e.g., based on data provided by client coordinator 130) that a single-master service (such as service 152A, from which client 114A requires data or processing) is hosted in data center 150. Client 114A causes a request to be transmitted over network link 190 to service 152. The request may be processed and forwarded by one or more intermediate computing devices that are in data center 110, in data center 150, and/or part of network link 190.

Network link 190 may be implemented by any medium or mechanism that provides for the exchange of data between data centers 110 and 150. Examples of network link 190 include, without limitation, a network such as a Local Area Network (LAN), Wide Area Network (WAN), Ethernet or the Internet, or one or more terrestrial, satellite or wireless links.

Service Coordinator

In an embodiment, service coordinator 120 is primarily a data repository of mastership data and/or status data. Service coordinator 120 may use a data model styled after the directory tree structure of file systems. Mastership data indicates which services in data center 110 (and, optionally, in data center 150) are master services and, of those single-master services, where (e.g., in which data center) the current master is running. Thus, services 112A-112N may be configured to regularly check (e.g., in response to each request from a client 114) where data should be retrieved/stored and/or which services are masters and which are slaves. Status data indicates an online/offline status about one or more services. The status data may provide additional information, such as a reason for an offline status (such as "maintenance") and an expected period of time when a change in status might occur.

In this "data repository" embodiment, services 112A-112N are configured to update the mastership data and/or status data and other computing entities may analyze and update the mastership/status data and make decisions based on that information.

In a related embodiment, service coordinator 120 is more than a data repository. Service coordinator 120 is a coordination service for distributed services, such as services 112A-112N. Service coordinator 120 exposes a set of primitives that distributed services can build upon to implement higher level services for synchronization, configuration maintenance, and groups and naming. An example of service coordinator 120 is ZooKeeper™ by Apache.

Thus, in this "coordination service" embodiment, service coordinator 120 actively notifies services 112A-112N about configuration changes, such as which database to use and/or which services are masters and which services are slaves. Such notifications may be sent in response to receiving change data, for example, from an administrator device (not depicted) in either data center 110 or data center 150.

Service coordinator 160 is similar to service coordinator 120 except that, in the coordination service embodiment, service coordinator 160 interacts with services 152A-152L. Service coordinator 160 may remain in sync with service coordinator 120. For example, any changes that are made to data maintained by service coordinator 120 are applied to data maintained by service coordinator 160 and vice versa. Thus, service coordinator 120 may send sync messages directed to service coordinator 160 and vice versa.

Master Services

Some of services 112A-112N may provide the same (i.e., redundant) service as some of services 152A-152L at the same time. Such services are referred to herein as "multiple master services." For multiple master services, a client may send a request to any instance of a service in any of the data centers. For example, client 114A may send a data request to either service 112A or 152A. Both services are expected to provide the same data in reply to client 114A. If either service 112A becomes unresponsive or fails for whatever reason, client 114A may send a request to service 152A.

However, in some scenarios where a service runs in each data center, only one service in one data center is allowed to respond to client requests. Such a service is referred to herein as a "single-master service." For example, if service 112A and service 152A provide the same service and that service is a single-master service, then either service 112A or service 152A is active and the other service is inactive or dormant. An active service is one that is allowed to respond to client requests, while a passive (or slave) service is one that is not allowed to respond to client requests. Thus, if a slave service receives a client request, then the slave service may respond to the client request by sending data that indicates that the slave service is unable to respond to the client request and, optionally, may indicate which service is the master. Continuing with the example, both service 112A and service 152A cannot be a master at the same time. Both service 112A and service 152A are allowed to be slaves at the same time, such as at start up and during a master switch.

Client Coordinator

Client coordinator 130 is a component that is used to notify clients 114A-114N which of services 112A-112N are master services, which are slave services, and, optionally, which are multiple master services. Client coordinator 130 may act as a passive repository of mastership data that indicates which services are masters. In this way, clients 114A-114N check client coordinator 130 (e.g., periodically or for each client request) regarding any configuration changes. Alternatively, client coordinator 130 is a service that actively notifies clients 114A-114N about changes in mastership and, optionally, other configuration changes.

Client coordinator 170 is similar to client coordinator 130 except that client coordinator 170 resides in data center 150 and, thus, serves clients 154A-154K.

Process Overview

Figure 2:
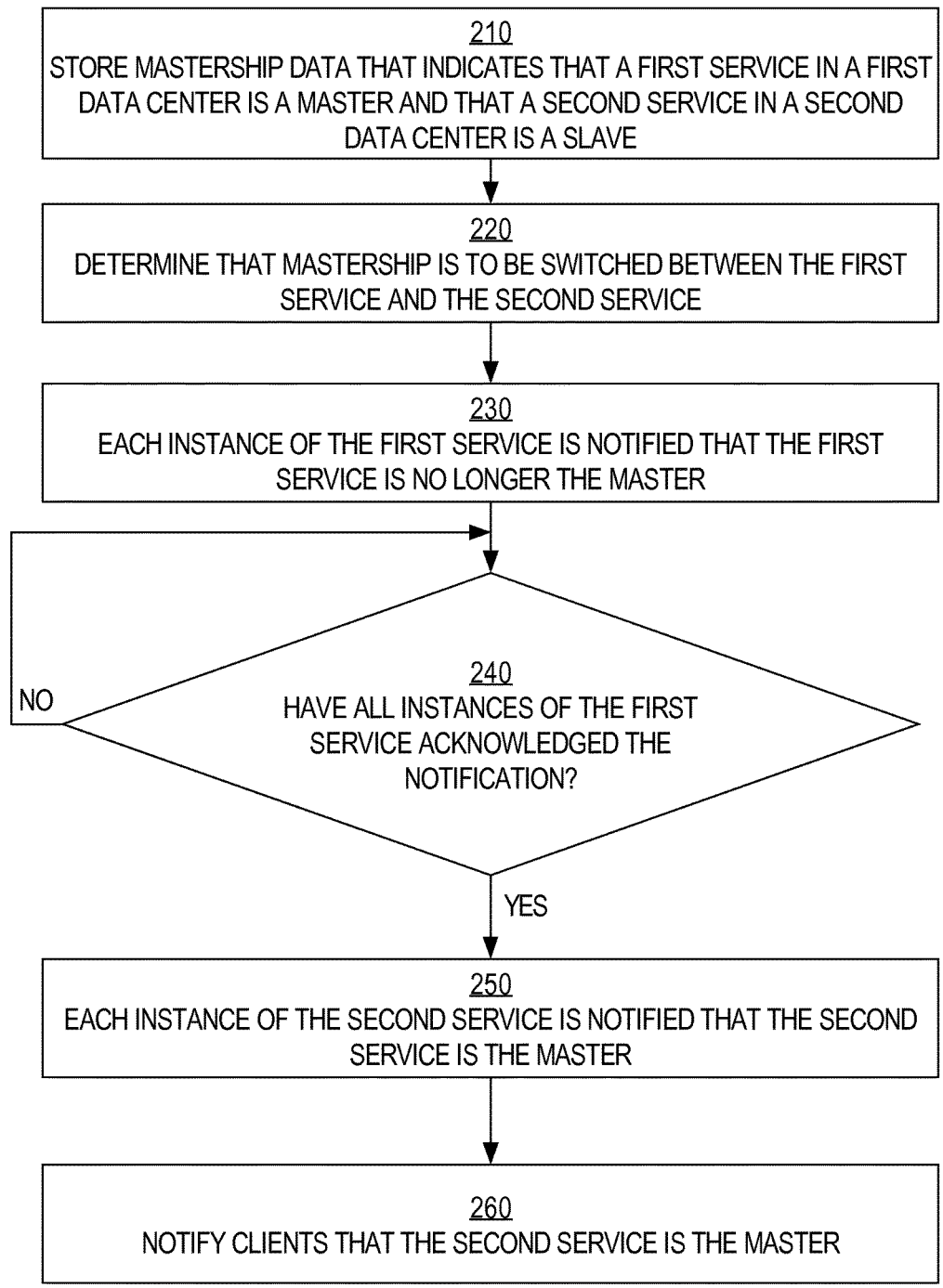
FIG. 2 is a flow diagram that depicts a general process for switching mastership, in an embodiment.

FIG. 2 is a flow diagram that depicts a process 200 for switching mastership, in an embodiment.

At block 210, first mastership data is stored that indicates that a first service in a first data center is a master service and a second service (in a second data center) is a slave service. The second service is redundant with respect to the first service.

At block 220, it is determined that the mastership is to be switched from the first service to the second service. This determination may be made, for example, in response to planned maintenance of one or more computing devices in the first data center.

At block 230, each instance of the first service is notified that the first service is no longer the master.

At block 240, it is determined whether all instances of the first service have acknowledged the notification of block 230. If not, then process 200 proceeds to block 240. Process 200 may pause or wait a particular amount of time before making the determination in block 240 again. Once all instances of the first service have acknowledged the notification, process 200 proceeds to block 250.

At block 250, each instance of the second service is notified that the second service is the master.

At block 260, clients (which may or may not have requested services of the first service previously) are notified that the second service is the new master. Thereafter, clients that would have sent requests to the first service instead send requests to the second service. In a related embodiment, block 260 occurs prior to block 250.

Example Process

Figure 3A:
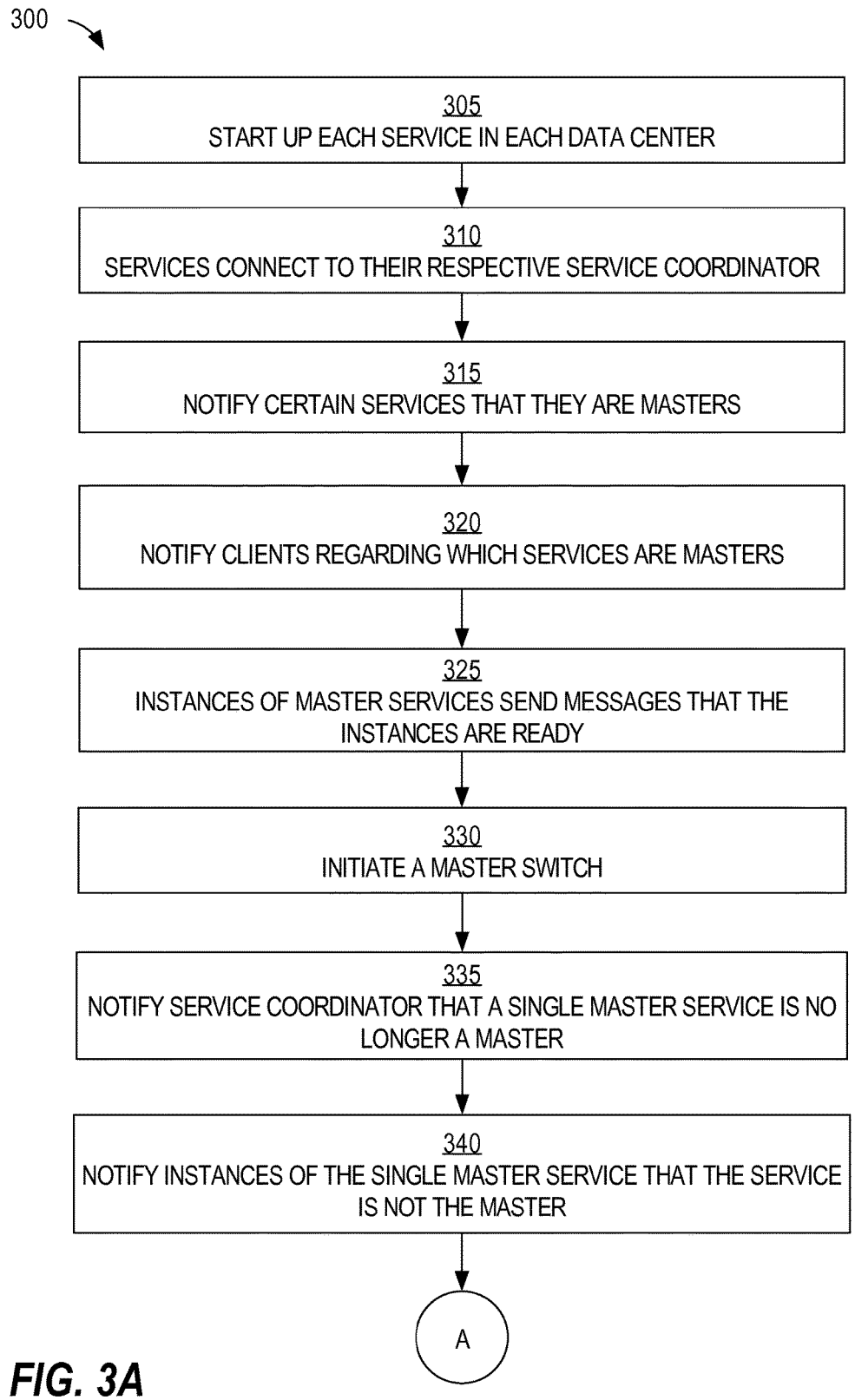
FIG. 3 (consisting of FIGS. 3A and 3B) is a flow diagram that depicts a specific process for switching mastership, in an embodiment.
Figure 3B:
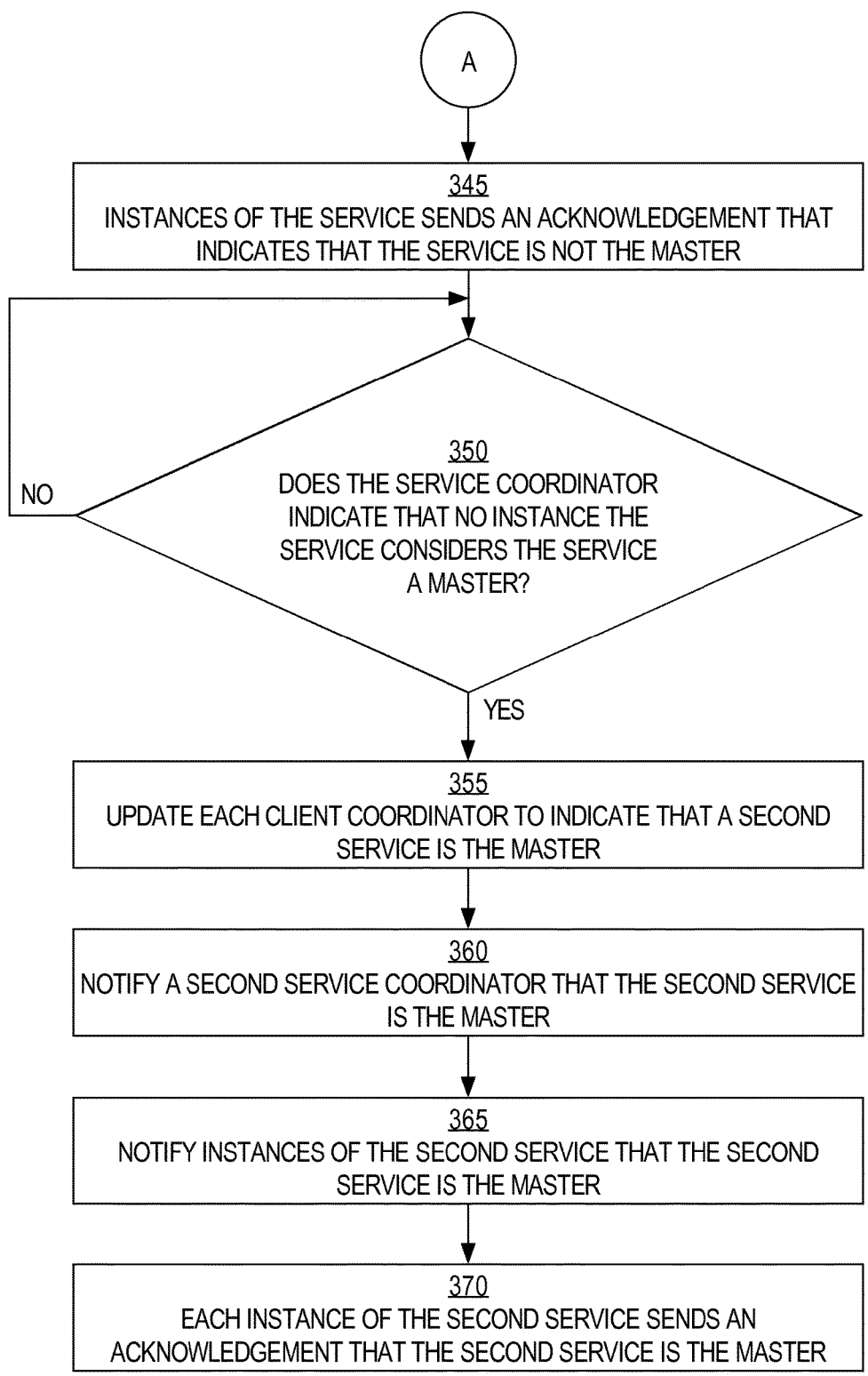

FIG. 3 is a flow diagram that depicts a process 300 for switching mastership, in an embodiment.

The initial state of each data center reflects which single-master services (if there are more than one) are masters.

Service coordinator 120 stores master indication data that indicates that particular single-master service in a data center is a master. In the following description, service 112A is considered a master while service 152A is considered a slave. (Thus, service coordinator 120 does not store master indication data that indicates that service 152A is a master.)

Client coordinator 130 stores also master indication data that indicates that service 112A is a master. Later, clients 154A-154K use client coordinator 130 to determine which of services 112A and 152A is the master. Similarly, client coordinator 170 stores master indication data that indicates that service 112A is a master. Later, clients 154A-154K use client coordinator 170 to determine which of services 112A and 152A is the master.

The state of service coordinator 120 may indicate the following:

```
/singlemaster
    /Service1:Colo1
``` where "Service1" is a label for service 112A and "Colo1" is a label for data center 110. While only one service is listed, if there are other single-master services hosted in data center 110, then the state of service coordinator 120 may indicate the following:

```
/singlemaster
    /Service1:Colo1
    /Service2:Colo1
    /Service3:Colo2
    ...
    /ServiceN:Colo1
```

Thus, the state of service coordinator 120 may be organized as a file system and each listed service may retrieved by submitting a path to service coordinator 120, such as "/singlemaster/", which may be a directory and a file. Service coordinator 120 may return each child path under "/singlemaster/", such as "/Service1:Colo1, /Service2:Colo1 . . . ."

The state of each client coordinator (e.g., client coordinator 130 and client coordinator 170) may indicate the following:

```
/services
    Service1Master → Service1-Colo1
``` where "Colo2" is a label for data center 150. Thus, there is a mapping from a service master designation ("Service1Master") to a location for that master. ("Service1-Colo1"). Client coordinator 130 may also contain a mapping to specific nodes or computing devices that host Service1. Alternatively, a client (e.g., client 114A) may send location data (e.g., "Service1-Colo1") to the appropriate service coordinator, which will return node data that identifies one or more computing devices that host the requested service (e.g., Service1).

At block 305, services start up in each data center. For example, each of services 112A-112N start up in data center 110 and each of services 152A-152L in data center 150 start up.

Block 305 also involves clients in each data center starting up. For example, each of clients 114A-114N start up in data center 110 and each of clients 154A-154K in data center 150 start up.

At block 310, services connect to their respective service coordinator. For example, services 112A-112N connect to service coordinator 120 and services 152A-152L connect to service coordinator 160.

Block 310 also involves clients connecting to their respective client coordinator. For example, clients 114A-114N connect to client coordinator 130 and clients 154A-154K connect to client coordinator 170.

At block 315, some single-master services are notified that they are masters. Other single-master services are not so notified or are notified that they are slave services. Service coordinator 120 may be the entity that is responsible for notifying single-master services. In an embodiment, if a single-master service is not notified that it is a master, then, by default, that single-master service is considered a slave. For example, if service 152A is not notified that it is master, then service 152A will act as a slave.

At block 320, clients in each data center are notified which single-master services are master services. For example, client coordinator 170 notifies each of clients 154A-154K that service 112A is a master service. Thus, if client 154A has a request that can be processed by one of services 112A and 152A, then client 154A will send the request to service 112A.

At block 325, for master services, each corresponding service instance sends, to service coordinator 120, a message that indicates that the corresponding service instance is ready. A result of the message may be the creation of an entry or node in service coordinator 120. Such as node may exist as long as the session that created the node is active. If the session ends, then node is deleted. For example, as part of a connection between service 112A and service coordinator 120, service coordinator 120 creates a session (e.g., in block 310). Later, service 112A sends, to service coordinator 120, a message that indicates that service 112A is a master (e.g., in block 325). In response, service coordinator 120 creates a node that indicates that service 112A is a master. Then, if service 112A fails, the session ends and the node is deleted. Thus, such nodes are considered "ephemeral" or temporary nodes. Service coordinator 120 may maintain non-ephemeral or permanent nodes that persist even in the case of service coordinator 120 crashing or an entire data center shutting down. Permanent nodes are backed up with files that persist even in the case of a crash.

After block 325, the state of service coordinator 120 may indicate the following:

/singlemaster
  /Service1:Colo1
    /node1: colo1-machine1
    /node2: colo1-machine2
    /node3: colo1-machine3
    /node4: colo1-machine4

In this example, four instances of Service1 sent the message (of block 325) to service coordinator 120. Thus, Service1 is provided by four machines (or computing devices), one named "machine1", another named "machine2", and so forth. The label "node1" refers to a specific entry that is created in a hierarchy in service coordinator 120 (e.g., based on a message from a service instance). The path "/singlemaster/Service1/node2" in service coordinator 120 uniquely identifies a particular computing device in data center 110 (which machine is labeled "colo1-machine2"). The data associated with path "/singlemaster/Service1/node2" may include specific information about the computing device that hosts an instance of Service1, such as MAC address and IP address.

At block 330, a master switch is initiated. The master switch may be initiated by administrator input or an automated process, which may be triggered by an unexpected event, such as a hardware failure or a software failure. The failure may be within a data center or external to a data center. For example, data connections to data center 110 may fail, causing data center 110 to be incapable of receiving and responding to end-user requests. As another example, power to the computing device(s) upon which service 152A executes is cut off. In this case, service 152A would be unable to receive any messages and service controller 160 would be automatically updated to remove service 152A as the current master. An administrator may manually initiate a switch to notify a new master (e.g., service 112A to take over. As another example, the computing device(s) upon which service 152A executes may shut down for a scheduled maintenance. In this case, an administrator initiates a switch before shutdown.

At block 335, service coordinator 120 is notified that the single-master service is not a master any more. Block 335 may be performed by executing a script that, when executed, causes an update request to be sent to service coordinator 120, where the update request indicates that a particular service is not a master. For example, the update request may specify "/singlemaster/Service1: None". The script may be executed by a computing device that hosts service coordinator 120 or by a computing device that is different than (but communicatively coupled to) the computing device that hosts service coordinator 120. As another example, the script may directly update a node or entry in data maintained by service coordinator 120 to indicate that a particular service is no longer a master.

After block 335, the state of service coordinator 120 may indicate the following:

/singlemaster
  /Service1: None
    /node1: colo1-machine1
    /node2: colo1-machine2
    /node3: colo1-machine3
    /node4: colo1-machine4

Before the current slave service is notified that it is a master, the entity that notifies (in block 335) service coordinator 120 regarding the single-master service waits until one or more criteria are satisfied. Such criteria may be receiving confirmation that each instance of the previous single-master service has acknowledged that the instance is not a master anymore.

At block 340, the instances of the previous single-master service (i.e., Service1 in this example) are notified that Service 1 in Colo1 is no longer the master. Block 340 may involve service coordinator 120 sending a mastership change notification to each instance of Service 1 in response to receiving the update request in block 335. Thus, if instances of Service1 run on ten computing devices, then service coordinator 120 sends a mastership change notification to each of the ten computing devices.

At block 345, each instance that receives a mastership change notification sends, to service coordinator 120, an acknowledgement that acknowledges the change in mastership from master to slave. Each instance may directly delete an entry or node in data maintained by service coordinator 120. Either way, each instance effectively unregisters itself from service coordinator 120 with respect to the instances' mastership designation.

If an instance is currently processing a client request when the instance receives a mastership change notification, then the instance may wait until the client request is fully processed before sending an acknowledgement to service coordinator 120. In this way, instances that are currently handling client requests do not have to abort the client requests.

Block 345 may also involve each instance that receives a mastership change notification performing one or more operations, such as switching to a read-only mode, where a service instance may respond to client requests that do not involve writing or updating persistent data. For example, a request may be for a read-only copy of a user's current profile information. Requests to modify the profile would be rejected.

After block 345, the state of service coordinator 120 may indicate the following:

```
/singlemaster
    /Service1: None
```

At block 350, it is determined whether service coordinator 120 indicates that no instance of Service1 considers Service1 of Colo1 a master. This determining may be performed multiple times. For example, the script may contain logic that checks service coordinator 120 every second (or ten milliseconds) to make the determination. The executed logic may check to determine whether there are any entries or nodes under path "/singlemaster/Service1", which is maintained by service coordinator 120. Once it is determined that no instance of Service1 considers Service1 in Colo1 a master, process 300 proceeds to block 355.

Subsequent to block 350 and prior to block 355, clients 114A-114N and 154A-154K that require data or processing by Service1 will send requests to Service1 in Colo1, even though that service is no longer a master. In response to receiving such requests, Service1 in Colo1 may send an error or decline message to the sending clients. In response to receiving an error or decline message, clients 114A-114N and 154A-154K may be configured to communicate with one of client coordinator 130 and 170 to determine which service is the current master. The client may initiate the communication with one of the client coordinators, for example, after a particular period of time, such as one second. Prior to block 355, client coordinators 130 and 170 may reply that Service1 in Colo1 is the current master. Thus, clients 114A-114N and 154A-154K may continuously send requests (with occasional pauses) to Service1 in Colo1 and a client coordinator until the master switch has completed and clients 114A-114N and 154A-154K are notified of the switch.

At block 355, client coordinator 130 and client coordinator 170 are updated to indicate that Service1 in Colo2 is a master. For example, the state of client coordinator 130 and 170, after the update, may indicate the following:

```
/services
    /Service1Master → Service1-Colo2
```

Block 355 may involve executing a script (such as the same script that caused service coordinator 120 to indicate that Service1 is no longer a master) that, when executed, sends a mastership change notification to each of client coordinators 130 and 170.

Once client coordinators 130 and 170 are notified about the change in mastership, each of client coordinators 130 and 170 may notify clients in their respective data centers about the change. For example, client coordinator 130 notifies clients 114A-114N while client coordinator 170 notifies clients 154A-154K.

At block 360, service coordinator 160 is notified that a current slave master in data center 150 is to be a new master. Again, block 360 may involve executing a script (which may be the same script described previously) that, when executed, sends a new master message to service coordinator 160. After block 360, the state of service coordinator 160 may indicate the following:

```
/singlemaster
    /Service1: Colo2
```

At block 365, the service instances of Service1 in Colo2 (e.g., data center 150) are notified that they are now services instances of a single-master service. In other words, Service1 in Colo2 becomes a master service.

Subsequent to block 355 and prior to block 365 completing, a client (e.g., client 114A) in Colo2 (e.g., data center 150) may have been notified that Service1 in Colo2 is the current master. Thus, the client may have sent a request to Service1 in Colo2 before Service1 in Colo2 has been notified that it is the master. In this scenario, Service1 in Colo2 may respond to the request with an error message. The client may wait and retry later, for example, after Service1 in Colo2 has been notified that it is the master.

At block 370, each service instance of Service1 in Colo2 sends, to service coordinator 160, an acknowledgment that the service instance is an instance of a master service. Block 370 may involve service coordinator 160 creating an entry or node that indicates a specific computing device upon which a corresponding service instance executes. After block 370, the state of service coordinator 160 may indicate the following:

```
/singlemaster
    /Service1: Colo2
        /node1: colo2-machine1
        /node2: colo2-machine2
        /node3: colo2-machine3
        /node4: colo2-machine4
``` where "Colo2" is a label for data center 150, "Service1: Colo2" is a label for service 152A, and "colo2-machine[x]" refers to a specific computing device in data center 150.

One benefit of techniques described herein is that no service in either data center is required to be taken down and restarted in order to switch masters among the data centers while still ensuring that no two redundant services act as master services at the same time.

Variations

In a related embodiment, client coordinators 130 and 170 are notified of a master switch at different times than that indicated in process 300. For example, client coordinators 130 and 170 may be notified that Service1 in Colo1 is not a master service prior to service coordinator 120 being notified. As another example, client coordinators 130 and 170 may be notified that Service1 in Colo2 is a master service after each instance of Service1 in Colo2 is notified that it is a master.

In a related embodiment, instead of having a period of time after failover when neither Service1 in Colo1 nor Service1 in Colo2 is a master service, both Service1 in Colo1 and Service1 in Colo2 are masters for a period of time during a failover. For example, instead of waiting until the state of service coordinator 120 no longer indicates that any service instances of Service1 in Colo1 considers Service1 in Colo1 a master, the waiting involves waiting for one or more service instances of Service1 in Colo2 to acknowledge that Service1 in Colo2 is a master before notifying the service instances of Service 1 in Colo1 that Service1 in Colo1 is no longer a master. Thus, the state of service coordinator 120 and/or service coordinator 160 may indicate the following:

```
/singlemaster
    /Service1: Colo1, Colo2
        /node1: colo1-machine1
        /node2: colo1-machine2
        /node3: colo1-machine3
        /node4: colo1-machine4
        /node5: colo2-machine1
        /node6: colo2-machine2
```

Such an embodiment may be used where it is more important to not lose any client requests than to avoid duplicate calls of database writing collisions.

In a related example, all but one instance of Service1 in Colo1 is notified that Service1 in Colo1 is no longer the master. Then, once one or more instances of Service1 in Colo2 are notified that Service1 in Colo2 is the master, then the remaining instance of Service1 in Colo1 is notified that Service1 in Colo1 is no longer the master.

In an embodiment, entries or nodes maintained by service coordinators 120 and 160 depend on a constant connection with the corresponding services. For example, if an instance of service 152A fails, then a corresponding node in service coordinator 120 is deleted. Thus, if the reason for a master switch is due to a current master going down or otherwise becoming unresponsive, then the corresponding nodes will be deleted automatically, allowing the master switch to proceed.

Similarly, if clients 114A-114N in data center 110 are unresponsive or unreachable for any reason, then such clients may not receive a message about a master switch. However, such a situation is not critical because the clients in data center 110 are non-functional anyway. In response to executing a script to initiate a master switch, clients 154A-154K in data center 150 will receive a notification of the master switch (e.g., through client coordinator 170) and will begin communicating with the new master in data center 150.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
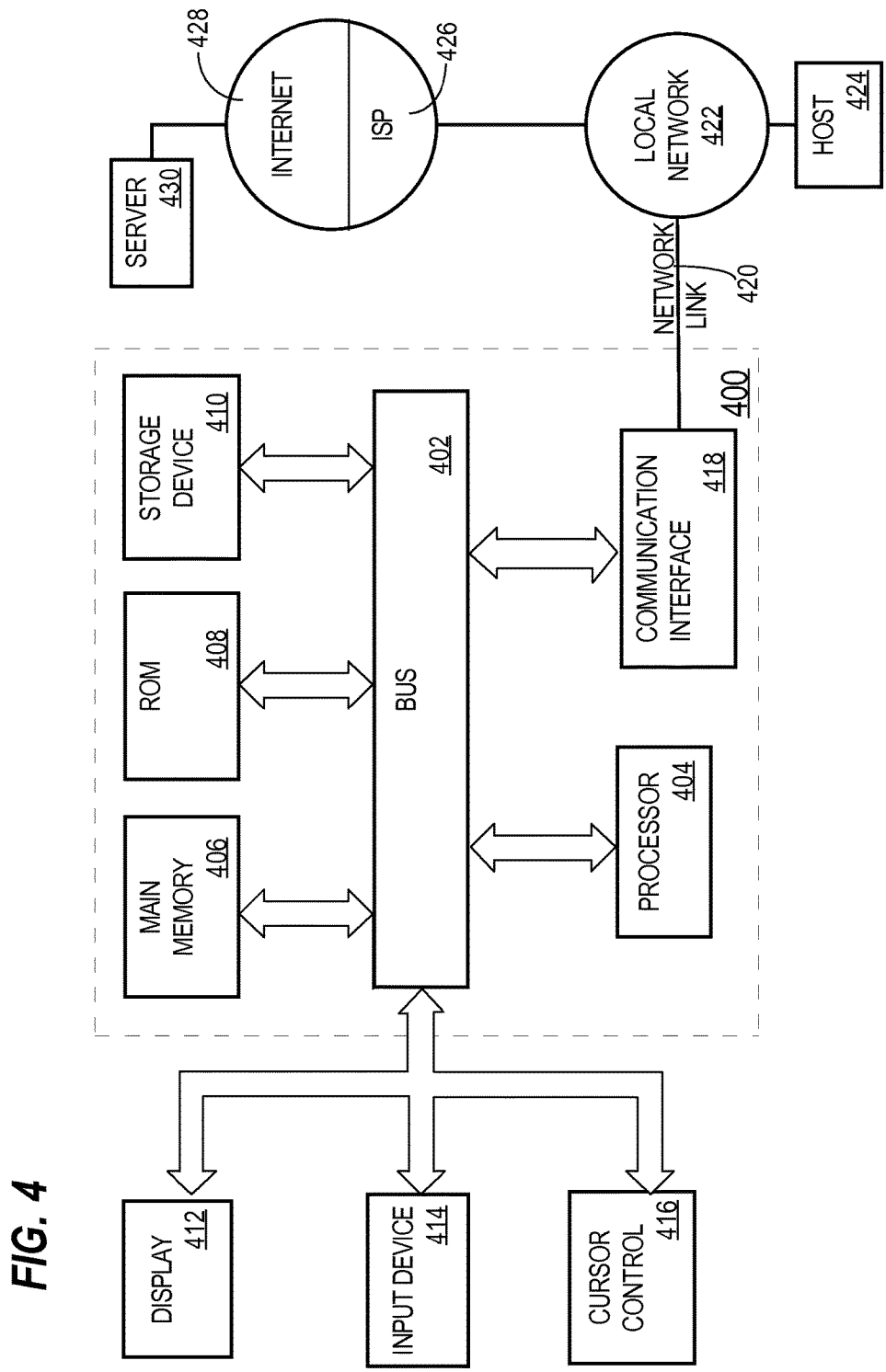
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   determining to switch mastership between a first service in a first data center and a second service in a second data center that is different than the first data center, wherein the first service and the second service are configured to provide the same service;
   in response to determining to switch mastership between the first service and the second service:
      sending, to each instance in a first set of instances of the first service, a mastership change notification, wherein the first set of instances of the first service comprises multiple instances of the first service;
      waiting until each instance in the first set of instances of the first service has acknowledged that the first service is no longer a master service;
   in response to determining that each instance of the first set of instances of the first service has acknowledged that the first service is no longer the master service, causing a second set of instances of the second service to be notified that the second service is the master service;
   wherein the method is performed by one or more computing devices.

2. The method of claim 1, wherein when it is determined to switch mastership between the first service and the second service, the first service is designated as a master and the second service is designated as a slave.

3. The method of claim 1, wherein:
   each instance in the first set of instances is hosted on a different node of a plurality of nodes in the first data center.

4. The method of claim 1, further comprising, prior to determining that each instance of the first set of instances of the first service has acknowledged that the first service is no longer the master service, updating first mastership data to indicate that the first service is no longer the master service.

5. The method of claim 4, wherein updating the first mastership data causes a service coordinator to notify each instance of the first set of instances that the first service is no longer a master service.

6. The method of claim 5, wherein waiting comprises checking the service coordinator one or more times to determine whether each instance of the first set of instances of the first service has acknowledged that the first service is no longer the master service.

7. The method of claim 5, wherein the service coordinator is in the first data center.

8. The method of claim 1, wherein causing the second set of instances of the second service to be notified comprises updating first mastership data to indicate that the second service is the master service.

9. The method of claim 8, wherein updating the first mastership data causes a service coordinator to notify each instance of the second set of instances that the second service is the master service.

10. The method of claim 9, wherein the service coordinator is in the second data center.

11. The method of claim 1, further comprising, prior to causing the second set of instances of the second service to be notified that the second service is the master service:
causing a set of one or more clients in the first data center to be notified that the second service is the master service.

12. The method of claim 11, wherein causing the set of one or more clients to be notified comprises updating mastership data to indicate that the second service is the master service.

13. The method of claim 12, wherein updating the mastership data causes a client coordinator in the first data center to notify each client in the set of one or more clients that the second service is the master service.

14. The method of claim 12, wherein:
the mastership data is first mastership data and is stored in the first data center;
the set of one or more clients are is a first set of one or more clients;
the method further comprising:
prior to causing the second set of instances to be notified, storing second mastership data that indicates that the first service is a master service, wherein the second mastership data is used to notify a second set of one or more clients, in the second data center, that the first service is the master service;
after determining to switch mastership between the first service and the second service, causing the second mastership data to be updated to indicate that the second service is the master service.

15. The method of claim 1, wherein waiting and causing are performed in response to executing a script on a first computing device that is communicatively coupled to a second computing device in the first data center or the second data center.

16. The method of claim 15, wherein executing the script causes: (1) a service coordinator associated with the first data center to indicate that the first service is no longer the master service; (2) a first client coordinator in the first data center to indicate that the second service is the master service; and (3) a second client coordinator in the second data center to indicate that the second service is the master service.

17. The method of claim 1, wherein determining to switch mastership between the first service and the second service comprises determining to switch mastership between the first service and the second service based on executing a script.

18. The method of claim 1, wherein the first service is active when the mastership change notification is sent to each instance in the first set of instances.

19. The method of claim 1, further comprising receiving user input, wherein determining to switch the mastership between the first service and the second service is performed in response to receiving the user input.

20. The method of claim 1, wherein at least one instance in the first set of instances is processing a client request for the first service when the at least one instance receives the mastership change notification.

21. A method comprising:
storing first data that indicates that a first service in a first data center is a master service;
while storing the first data, storing second data that indicates that a second service, in a second data center that is different than the first data center, is a slave service;
wherein the first service and the second service are configured to provide the same service;
determining, by a service coordinator executing in the second data center, to switch mastership between the first service and the second service;
in response to determining to switch mastership between the first service and the second service and while storing the first data:
storing third data that indicates that the second service in the second data center is the master service,
sending, by the service coordinator, to each instance of one or more instances of the second service, a mastership change notification,
after sending the mastership change notification, waiting, by the service coordinator, until at least one instance of the second service has acknowledged that the second service is the master service, and
causing one or more clients in the first data center or the second data center to be notified that the second service is the master service;
wherein the method is performed by one or more computing devices.

22. One or more non-transitory storage media storing instructions which, when executed by one or more computing devices, cause:
determining to switch mastership between a first service in a first data center and a second service in a second data center that is different than the first data center, wherein the first service and the second service are configured to provide the same service;
in response to determining to switch mastership between the first service and the second service:
sending, to each instance in a first set of instances of the first service, a mastership change notification;
waiting until each instance in the first set of instances of the first service has acknowledged that the first service is no longer the master service;
in response to determining that each instance of the first set of instances of the first service has acknowledged that the first service is no longer the master service, causing a second set of instances of the second service to be notified that the second service is the master service.

23. The one or more non-transitory storage media of claim 22, wherein the instructions, when executed by the one or more computing devices, further cause, prior to determining that each instance of the first set of instances of the first service has acknowledged that the first service is no longer the master service, updating first mastership data to indicate that the first service is no longer the master service.

24. The one or more non-transitory storage media of claim 23, wherein updating the first mastership data causes a service coordinator to notify each instance of the first set of instances that the first service is no longer the master service.

25. The one or more non-transitory storage media of claim 24, wherein waiting comprises checking the service coordinator one or more times to determine whether each instance of the first set of instances of the first service has acknowledged that the first service is no longer the master service.

26. The one or more non-transitory storage media of claim 22, wherein causing the second set of instances of the second service to be notified comprises updating first mastership data to indicate that the second service is the master service.

27. The one or more non-transitory storage media of claim 26, wherein updating the first mastership data causes a service coordinator to notify each instance of the second set of instances that the second service is the master service.

28. The one or more non-transitory storage media of claim 22, wherein the instructions, when executed by the one or more computing devices, further cause, prior to causing the second set of instances of the second service to be notified that the second service is the master service:
  causing a set of one or more clients in the first data center to be notified that the second service is the master service.

29. The one or more non-transitory storage media of claim 28, wherein causing the set of one or more clients to be notified comprises updating mastership data to indicate that the second service is the master service.

30. The one or more non-transitory storage media of claim 29, wherein updating the mastership data causes a client coordinator in the first data center to notify each client in the set of one or more clients that the second service is the master service.

31. The one or more non-transitory storage media of claim 29, wherein:
  the mastership data is first mastership data and is stored in the first data center;
  the set of one or more clients are is a first set of one or more clients;
  the instructions, when executed by the one or more computing devices, further cause:
    prior to causing the second set of instances to be notified, storing second mastership data that indicates that the first service is the master service, wherein the second mastership data is used to notify a second set of one or more clients, in the second data center, that the first service is the master service;
    after determining to switch mastership between the first service and the second service, causing the second mastership data to be updated to indicate that the second service is the master service.

32. The one or more non-transitory storage media of claim 22, wherein waiting and causing are performed in response to executing a script on a first computing device that is communicatively coupled to a second computing device in the first data center or the second data center.

33. One or more non-transitory storage media storing instructions which, when executed by one or more computing devices, cause:
  storing first data that indicates that a first service in a first data center is a master service;
  while storing the first data, storing second data that indicates that a second service, in a second data center that is different than the first data center, is a slave service;
  wherein the first service and the second service are configured to provide the same service;
  determining, by a service coordinator executing in the second data center, to switch mastership between the first service and the second service;
  in response to determining to switch mastership between the first service and the second service and while storing the first data:
    storing third data that indicates that the second service in the second data center is the master service,
    sending, by the service coordinator, to each instance of one or more instances of the second service, a mastership change notification,
    after sending the mastership change notification, waiting, by the service coordinator, until at least one instance of the second service has acknowledged that the second service is the master service, and
    causing one or more clients in the first data center or the second data center to be notified that the second service is the master service.

* * * * *